United States Patent [19]

Hong et al.

[11] Patent Number: 5,448,571
[45] Date of Patent: Sep. 5, 1995

[54] METHOD AND APPARATUS FOR DETERMINING BYTE SYNCHRONIZATION WITHIN A SERIAL DATA RECEIVER

[75] Inventors: Ju-Hi J. Hong, San Jose; Roger W. Wood, Gilroy, both of Calif.

[73] Assignee: International Business Machines Corporation, Armonk, N.Y.

[21] Appl. No.: 233,168

[22] Filed: Apr. 26, 1994

[51] Int. Cl.⁶ ............................................. H04J 3/06
[52] U.S. Cl. ................................ 370/105.4; 375/365; 375/368
[58] Field of Search .................. 370/84, 105.3, 105.4, 370/100.1; 375/114, 119, 106, 118, 116, 17, 20, 110, 13

[56] References Cited

U.S. PATENT DOCUMENTS

| | | | |
|---|---|---|---|
| 4,032,885 | 6/1977 | Roth | 340/146.1 |
| 4,213,011 | 7/1980 | Hoelzl et al. | 370/100 |
| 4,320,517 | 3/1982 | Godard et al. | 375/114 |
| 4,573,171 | 2/1986 | McMahon et al. | 375/114 |
| 4,594,728 | 6/1986 | Niquel et al. | 375/116 |
| 4,748,623 | 5/1988 | Fujimoto | 370/100 |
| 4,787,095 | 11/1988 | Forth et al. | 375/114 |
| 4,807,230 | 2/1989 | Srinivasagopalan et al. | 371/46 |
| 4,815,103 | 3/1989 | Cupo et al. | 375/106 |
| 4,847,877 | 7/1989 | Besseyre | 375/116 |
| 5,005,191 | 4/1991 | O'Connor et al. | 375/116 |
| 5,010,559 | 4/1991 | O'Connor et al. | 375/116 |
| 5,073,906 | 12/1991 | Otani et al. | 375/116 |
| 5,267,267 | 11/1993 | Kazawa et al. | 370/105.4 |

*Primary Examiner*—Douglas W. Olms
*Assistant Examiner*—Ajit Patel
*Attorney, Agent, or Firm*—Leslie G. Murray; L. Bruce Terry; Andrew J. Dillon

[57] ABSTRACT

A synchronization pattern is provided within an incoming waveform which represents a serial data stream transmitted at a rate determined by a data clock. The synchronization pattern includes a periodic training portion and a sync word portion. The periodic training portion is periodic and has a preselected period. As the periodic training portion is received, a receiver clock phase-locks to the periodic training portion of the incoming waveform, and a sampling circuit periodically samples the incoming waveform relative to the phase and frequency of the receiver clock to produce sample words. Thereafter, a subset of the sample words are selected utilizing a selection pattern having a period equal to the period of the periodic training portion of the incoming waveform. Utilizing the selected subset of sample words, a sync indicator word is produced and compared to preselected criteria. Such a sync indicator word may be produced with reference to the sign of each sample word of the subset of sample words. Finally, in response to a correlation between the sync indicator word and the preselected criteria, byte synchronization between the incoming waveform and the data detector is indicated, wherein the byte synchronization independently from the output of a data detector.

18 Claims, 7 Drawing Sheets

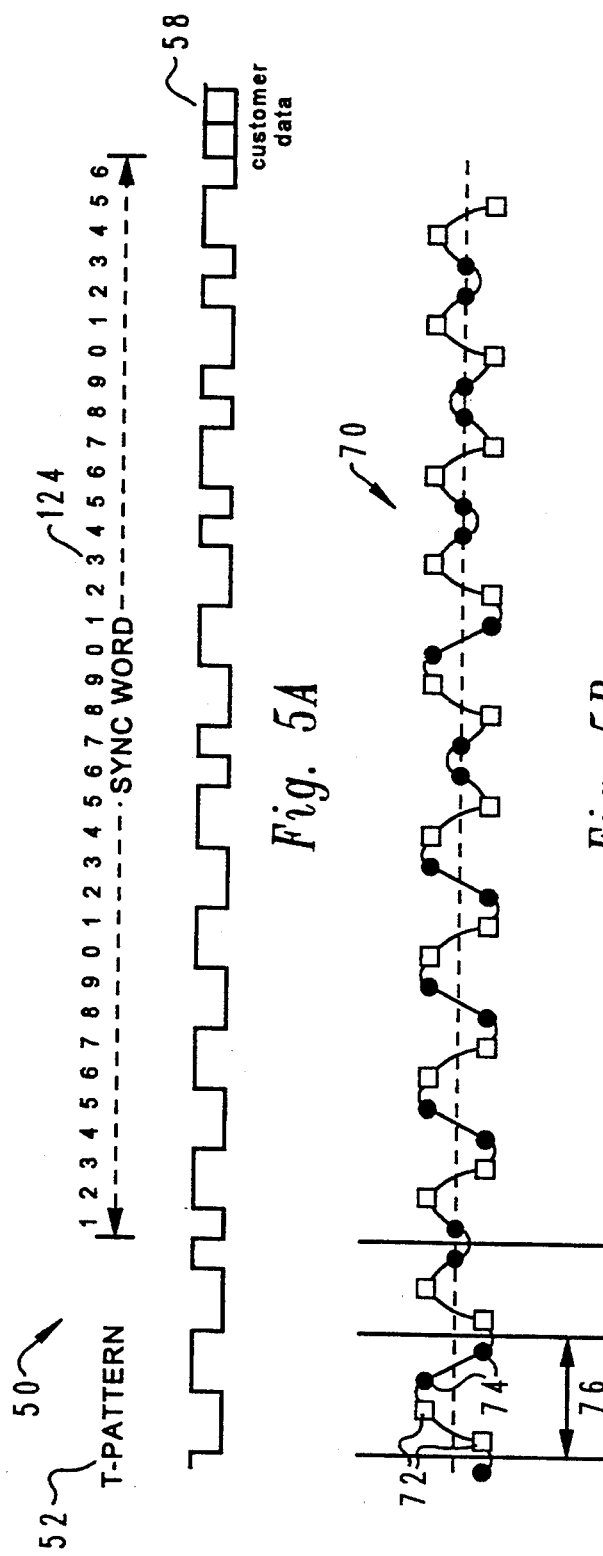
Fig. 5A
Fig. 5B
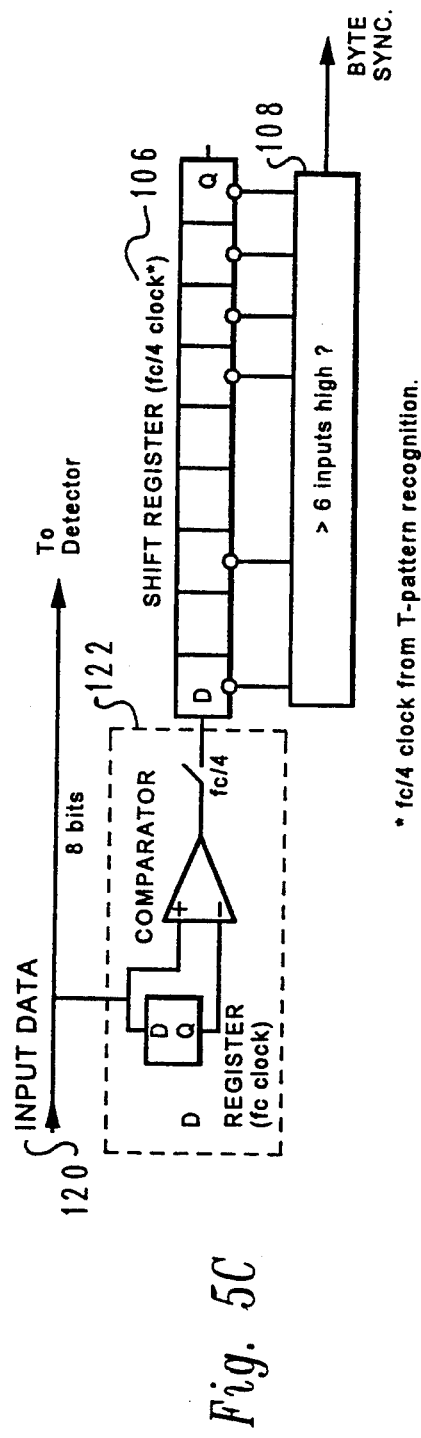
Fig. 5C

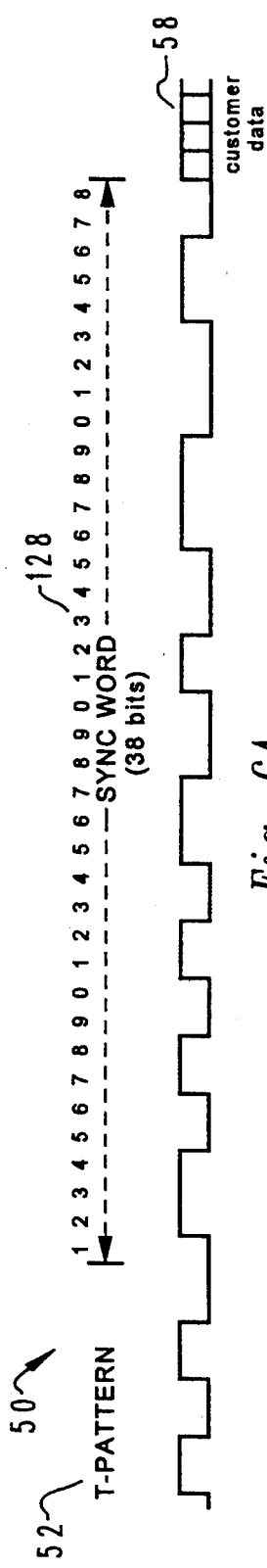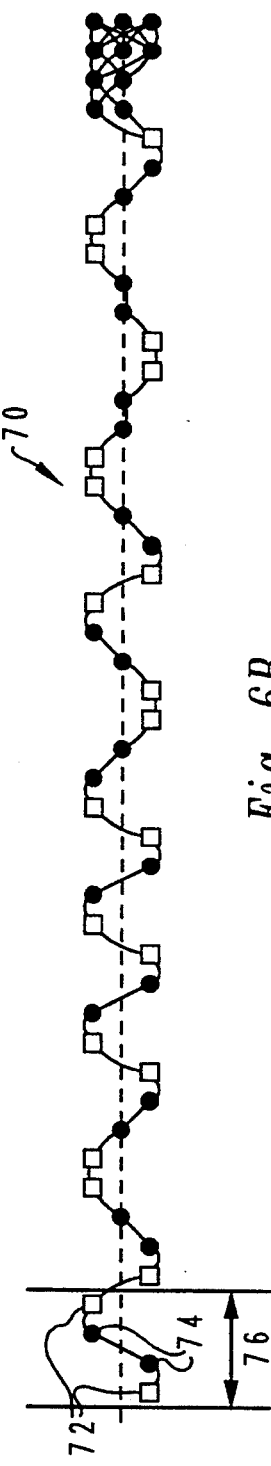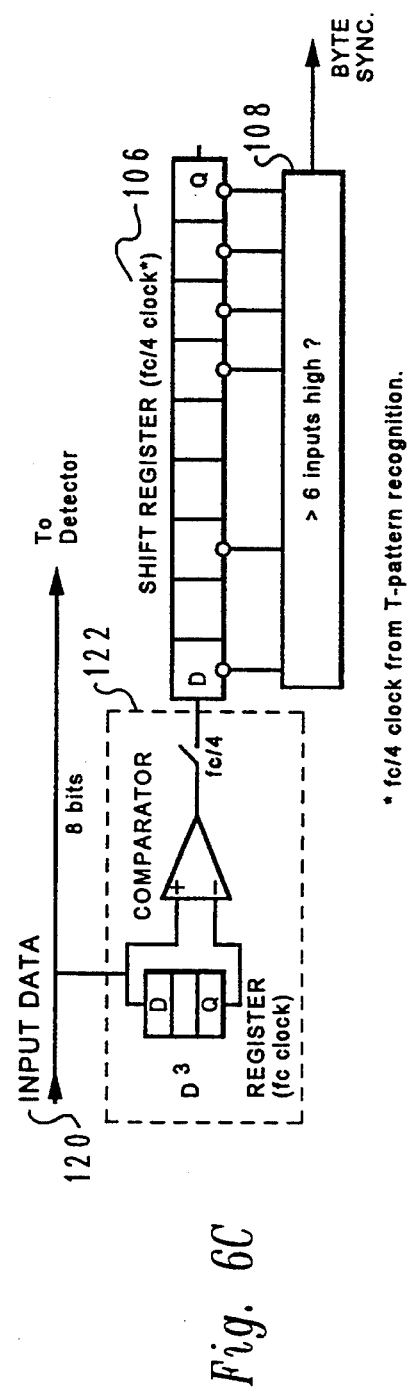
Fig. 6A
Fig. 6B
Fig. 6C

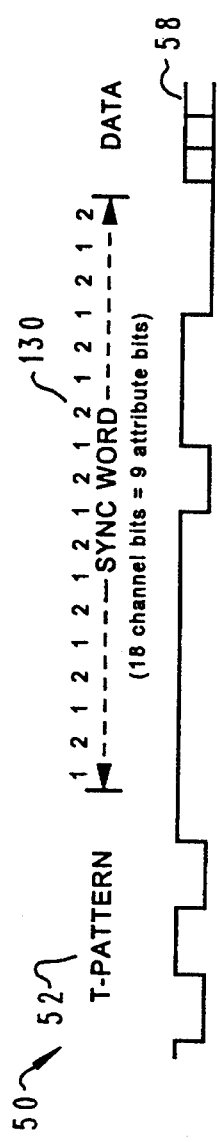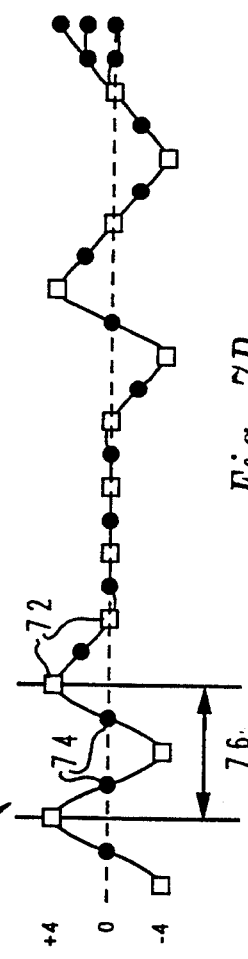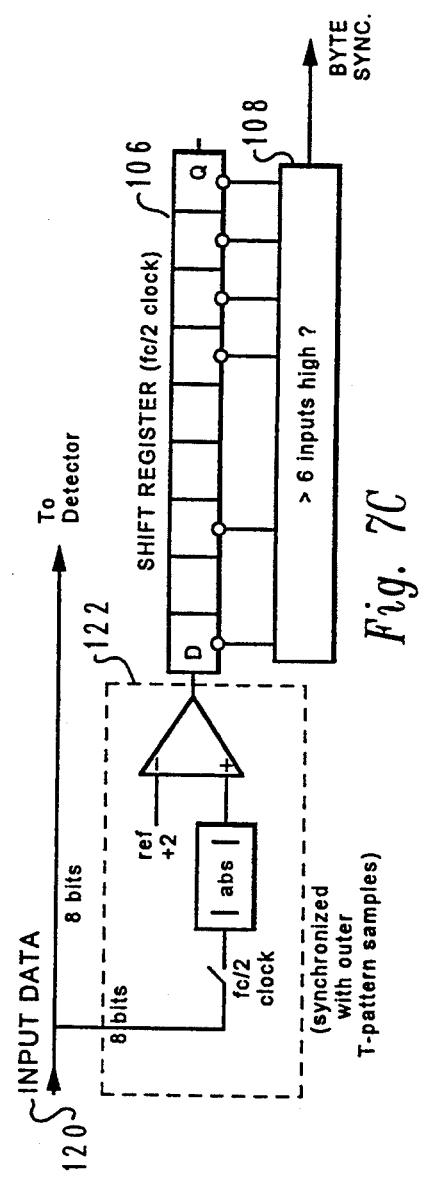

METHOD AND APPARATUS FOR DETERMINING BYTE SYNCHRONIZATION WITHIN A SERIAL DATA RECEIVER

BACKGROUND OF THE INVENTION

1. Technical Field

The present invention relates in general to an improved system and apparatus for receiving serially transmitted data, and in particular to a method and apparatus for determining byte synchronization between a received serial data stream and a data detector within a data processing system.

2. Description of the Related Art

When transmitting data serially, it is important that the sender and receiver of a serial data stream be in synchronization. When such synchronization between sending and receiving units is achieved, that condition may be referred to as obtaining byte synchronization, or "byte sync." Byte sync is required to correctly recognize and recover the transmitted data because recognizing the first bit of the first word of a customer data stream is necessary before the receiver is able to correctly interpret the data bits that follow, and correctly group those data bits into data words comprising the customer data.

Byte sync is achieved when the clock frequency and phase of the receiving unit has been aligned or synchronized with the data clock utilized to produce the data stream, and when the receiving unit has identified the first bit of the first word of the customer data portion of a serial data stream.

Since the reception of a customer data stream without being able to distinguish which data bits form a particular data word, or which word is the first word, is of no value, it is an important aspect of increasing transmission efficiency that a receiver's ability to obtain byte sync be at least as reliable as the transmission of the serial data stream containing customer data. While there are many known methods of improving transmission efficiency by detecting and correcting bit errors in the customer data portion of the serial data stream, such methods of improving efficiency are usually not available to improve the reliability of the portion of the serial data stream utilized to obtain byte sync. Methods available to detect and correct bit errors in the customer data portion typically include extra data, such as redundant parity check characters; but because the synchronization pattern at the beginning of a serial data stream typically comprises a relatively small number of bits, it may be impractical to add such extra data. Additionally, detecting and correcting errors takes time that may not be available while the receiver is attempting to locate the synchronization pattern utilized to obtain byte sync. Thus, it is important to reliably recognize the synchronization pattern to increase the overall efficiency of data transmission.

In a typical receiver, such a waveform serves as the input signal for an equalization circuit (i.e., an equalizer), and following the equalization circuit, a data detector circuit (i.e., a detector). The purpose of the equalizer is to reduce unwanted effects of overlapping signals which represent adjacent data bits, and to shape the waveform so that it conforms to a standard format for a particular type of detector. The effects of overlapping signals which represent adjacent data bits is referred to as intersymbol interference (ISI), and, in a partial response system, such ISI is utilized constructively by allowing ISI to occur in a controlled manner. The equalizer helps control ISI to maximize the probability that the detector will correctly detect data bits.

However, before some equalization circuits, such as adaptive equalizers, are able to control ISI, several equalizer coefficients utilized in the equalization process may need to be calculated. Typically, the calculation of equalizer coefficients occurs while receiving a known portion of a waveform, and many times, byte sync must occur before the equalizer can be trained by receiving a known waveform. If the waveform utilized to train the equalizer is known, including its placement in time, the calculation of equalizer co-efficients proceeds more accurately and rapidly than if the training waveform is not known. Thus, for best results, byte synchronization must occur before calculation of the equalizer co-efficients (i.e., training the equalizer).

The purpose of the detector is to produce a series of digital data bits by interpreting a periodic series of digitized samples representing the shape of the incoming waveform. By interpreting these digitized samples, the customer data may be correctly recovered from the incoming waveform. The accuracy of such data interpretation, however, is susceptible to the effects of misequalization, noise, distortion, DC offset, transients, electromagnetic interference, and the like. Recently, detectors have been designed that require an indication of byte sync before the detector is able to best interpret the digitized samples. Such detectors are called time-varying detectors.

Sources of noise include thermal or "Johnson" noise, and media noise (if the waveform is produced by reading magnetic or other media). Johnson noise is caused by the continuous movement of charged particles in the materials that make up electronic components. The source of media noise may be the granularity of the media surface, or variations in the surface of the magnetic media. Defects in the magnetic recording media may also cause variations in the amplitude of the input waveform. Additionally, a pin hole or dent in the magnetic media may cause the input waveform to disappear altogether.

Waveform distortion may result from misequalization, the addition of a DC offset, or transients. Misequalization may be caused by incorrectly setting equalizer coefficients, or, in the case of an adaptive equalizer, incorrectly training the equalizer circuit such that the equalizer coefficients are calculated incorrectly. A DC offset may be added to the waveform if the tolerance of circuit components drift and cause circuits to be out of adjustment. Transients may be caused by switching from a "writing" operation to a "reading" operation, or by switching from one read head to another read head in the disk drive unit.

Sources of electromagnetic interference include radiation from electric motors, electrostatic discharge, electric or magnetic fields, fluorescent lights, and the like. Two other sources of interference in a disk drive unit are previously recorded information which may not have been fully erased, and information recorded on adjacent tracks which is picked up by the read head because of inaccurate track following.

In the prior art, obtaining byte sync involves first receiving an analog waveform, which represents a serial data stream. An example of such a waveform is produced as a read head responds to flux changes on the surface of a magnetic storage media. Thereafter, such a waveform may be conditioned by an equalizer, and sampled by an analog-to-digital converter (ADC), to produce a data stream of data words having a standard format, such as, for example, the extended partial response class IV format. This data stream may then be passed to a detector circuit which interprets customer data, and attempts to recognize a sync word.

The operation of both the ADC and the detector are timed with respect to a receiver clock. Therefore, as part of preparing to receive customer data, the receiver clock must be phase-locked with a clock utilized to transmit or record the data stream. The process of phase-locking requires a finite time period The problem in the prior art of detecting byte sync lies in the fact that a circuit for indicating byte sync is monitoring the output of a detector for the appearance of a sync word, which, when received, indicates that byte sync exists. If the waveform is poorly equalized, or, where a time-varying detector is utilized, the time-varying detector has not been correctly set, the output from the detector will be unreliable. Thus, a byte sync derived from the output of a detector operating in an unreliable condition cannot be used to trigger the training of an adaptive equalizer with respect to a training waveform, or to set the timing for a time-varying detector. If a time-varying detector is utilized, the circuit for indicating byte sync may not rely on the output of the detector at all, because the output of such a time-varying detector is not valid until the detector has received an indication of byte sync.

Additionally, the process of detecting byte sync takes place during the reception of a number of data bits, as the training portion concludes and the sync word is being received. During this process, it is important to distinguish received bits that belong to the training portion of the incoming waveform from those bits that belong to the sync word portion. As the process receives information from the incoming waveform, it is important to avoid a determination that byte sync exists before all bits, or substantially all bits, of the sync word have been received. The indication of byte sync when byte sync does not exist may be called indicating a false byte sync condition. A false byte sync may be indicated if the sync word portion does not significantly differ from, or does not contrast with, the training portion of the incoming waveform. Such a difference or contrast between the two numbers may be referred to as the distance between the two numbers.

Therefore, it is desirable to provide a method and apparatus for identifying the first bit of the first word of data in a data stream, wherein the method and apparatus is not easily affected by input signal degradation due to media noise, thermal noise, amplitude variation, electromagnetic interference, phase misalignments, misequalization, transients, and D.C. offsets. Furthermore, it is desirable to provide a method and apparatus for identifying the first bit of the first word of data in a data stream that does not rely upon the output of a data detector.

SUMMARY OF THE INVENTION

It is therefore one object of the present invention to provide an improved system and apparatus for receiving serially transmitted data.

It is another object of the present invention to provide a method and apparatus for identifying the first bit of the first word of data in a data stream, wherein the method and apparatus is not easily affected by input signal degradation due to media noise, thermal noise, amplitude variation, electromagnetic interference, phase misalignments, misequalization, transients, and D.C. offsets.

It is yet another object of the present invention to provide a method and apparatus for identifying the first bit of the first word of data in a data stream that does not rely upon the output of a data detector.

The foregoing objects are achieved as is now described. A synchronization pattern is provided within an incoming waveform which represents a serial data stream transmitted at a rate determined by a data clock. The synchronization pattern includes a periodic training portion and a sync word portion. The periodic training portion is periodic and has a preselected period. As the periodic training portion is received, a receiver clock phase-locks to the periodic training portion of the incoming waveform, and a sampling circuit periodically samples the incoming waveform relative to the phase and frequency of the receiver clock to produce sample words. Thereafter, a subset of the sample words are selected utilizing a selection pattern having a period equal to the period of the periodic training portion of the incoming waveform. Utilizing the selected subset of sample words, a sync indicator word is produced and compared to preselected criteria. Such a sync indicator word may be produced with reference to the sign of each sample word of the subset of sample words. Finally, in response to a correlation between the sync indicator word and the preselected criteria, byte synchronization between the incoming waveform and the data detector is indicated, wherein the byte synchronization is determined independently from the output of a data detector.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 5A, 5B, and 5C depict a second embodiment of the method and system for determining byte synchronization in accordance with the present invention;

FIGS. 6A, 6B, and 6C depict a third embodiment of the method and system for determining byte synchronization in accordance with the present invention; and FIGS. 7A, 7B, and 7C, depict a fourth embodiment of the method and system for determining byte synchronization in accordance with the present invention.

DETAILED DESCRIPTION OF PREFERRED EMBODIMENT

Figure 1A:
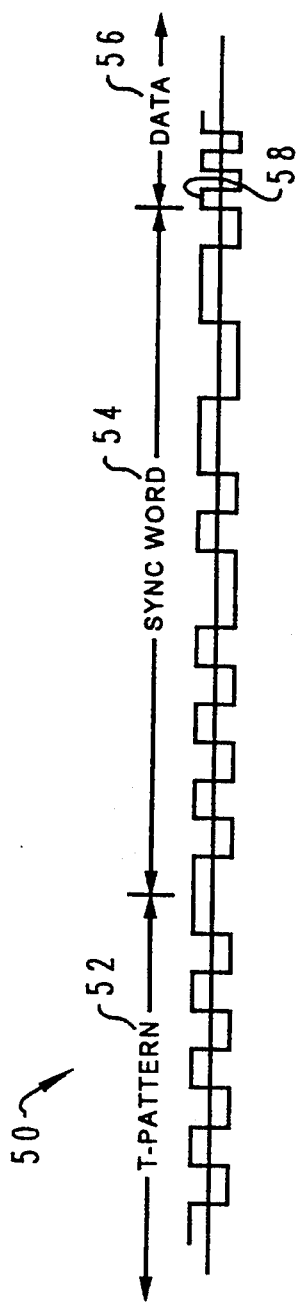
FIG. 1A depicts a binary waveform which includes a periodic training portion (a T-pattern), a sync word portion, and a customer data portion.

With reference now to the figures and in particular with reference to FIG. 1A, there is depicted binary waveform 50 which includes periodic training portion 52 (labeled as "T-PATTERN"), sync word portion 54, and customer data 56. Customer data 56 represents a serial stream of data which may have been stored on a magnetic storage media, such as a hard disk, or data which may have been transmitted serially via other media, such as radio waves, infrared radiation, or electrical or optical cable. Those persons skilled in the art of serial data transmission should recognize that while the preferred embodiment of the present invention is utilized to recognize and recover data stored on a disk drive, the present invention may be utilized in other devices designed to receive a serial data stream via any one of several media, such as those mentioned above.

For a data detector portion of a data receiver to correctly interpret customer data 56, such a data detector must be able to absolutely identify data bit 58, which is the first bit of the first word of customer data 56. In FIG. 1A, the width of data bit 58 represents the duration of one bit, which is the duration of one clock period of the clock utilized to transmit or create digital waveform 50.

As illustrated, periodic training portion 52 comprises two "high," or "one," bits followed by two "low," or "zero," bits. Periodic training portion 52 is typically twenty to thirty bits in length. Periodic training portion 52 is typically selected to produce an extended partial response IV waveform having a sinusoidal shape, a relatively high amplitude, and a relatively high frequency. The purpose of periodic training portion 52 is to provide an exemplary waveform which allows a receiver circuit to set an automatic gain control (AGC), and to provide a reference with which a receiver clock may be phase-locked. This receiver clock may be considered phase-locked with periodic training portion 52 when the receiver clock is operating at a frequency that is an integer multiple of the frequency of periodic training portion 52, and when the zero crossings or transitions of periodic training portion 52 coincide with a zero crossings or transitions of the receiver clock, or when there is some other specified relationship between the two waveforms.

When such a periodic bit pattern is read from a magnetic media within a disk drive, the partial response waveform produced preferably has a relatively high amplitude and a relatively high frequency. While the highest frequency waveform read from a magnetic media would be produced by a pattern having one high bit followed by one low bit, the amplitude of such a high frequency waveform may be significantly lower.

The selection of a training frequency with relatively high frequency and high amplitude is important for several reasons. Because a large amplitude signal is relatively immune to noise, drop outs, and other disturbances, it is beneficial to provide a periodic training portion 52 having a large signal. Because the phase-locked-loop of the receiver unit utilizes information from the periodic training portion 52 close to the zero-crossings, and because the phase-lock process is faster and more immune to noise and other disturbances if the zero-crossings are frequent and have a higher slope, it is beneficial to provide a periodic training portion 52 having a sinusoidal waveform, a relatively high frequency, and a high amplitude.

When the receiver clock and periodic training portion 52 are phase-locked, the data detector in the receiving unit, which operates at the receiver clock frequency, may be capable of sampling an incoming waveform at the appropriate time to distinguish one bit of data from a next bit of data. However, such a phase-locked condition does not mean the data detector will be able to identify which bits comprise a word in the customer data stream. That is, the data detector may not be able to identify word boundaries even though it is phase-locked with the incoming waveform. If word boundaries cannot be identified, the data detector may not be able to distinguish the bits comprising one word from the bits comprising the next word. This is the reason byte synchronization is important; byte synchronization establishes an absolute reference by identifying the first bit of the first word of a stream of customer data.

In some cases, extra bits may be added to sync word portion 54 to accommodate certain methods of analyzing data within sync word portion 54. In the embodiment disclosed in FIG. 1A, sync word portion 54 comprises thirty-six bits, which is nine times the length of the period of periodic training portion 52. These data bits are selected to produce a high amplitude signal when read from the surface of a magnetic media. The bits of sync word portion 54 are also selected to produce high magnitude samples, when sampled at particular times with reference to the period of periodic training portion 52, and to provide a higher "euclidean distance" between periodic training portion 52 and sync word portion 54.

Figure 1B:
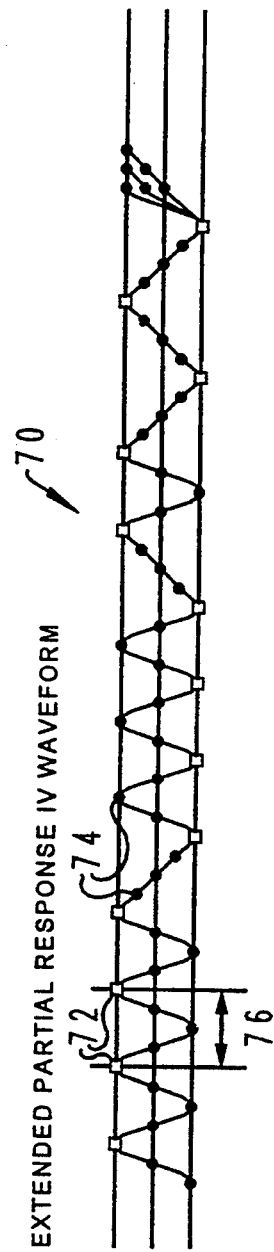
FIG. 1B depicts an analog waveform which represents the digital waveform of FIG. 1A.

With reference now to FIG. 1B, there is depicted analog waveform 70 which represents digital waveform 50, of FIG. 1A. Analog waveform 70 is typical of a waveform produced by a read head reading flux changes recorded in partial response signaling format on the surface of a magnetic media, such as the surface of a hard disk.

Superimposed upon analog waveform 70 are sample points 72 and 74, which indicate times at which the voltage of analog waveform 70 has been sampled and digitized. Sample points resembling sample point 72 indicate selected samples selected from each period of periodic training portion 52. The time duration between consecutive sample points 72 is the period 76 of periodic training portion 52. The purpose of differentiating sample points 72 from sample points 74 will be explained in detail below.

Figure 2:
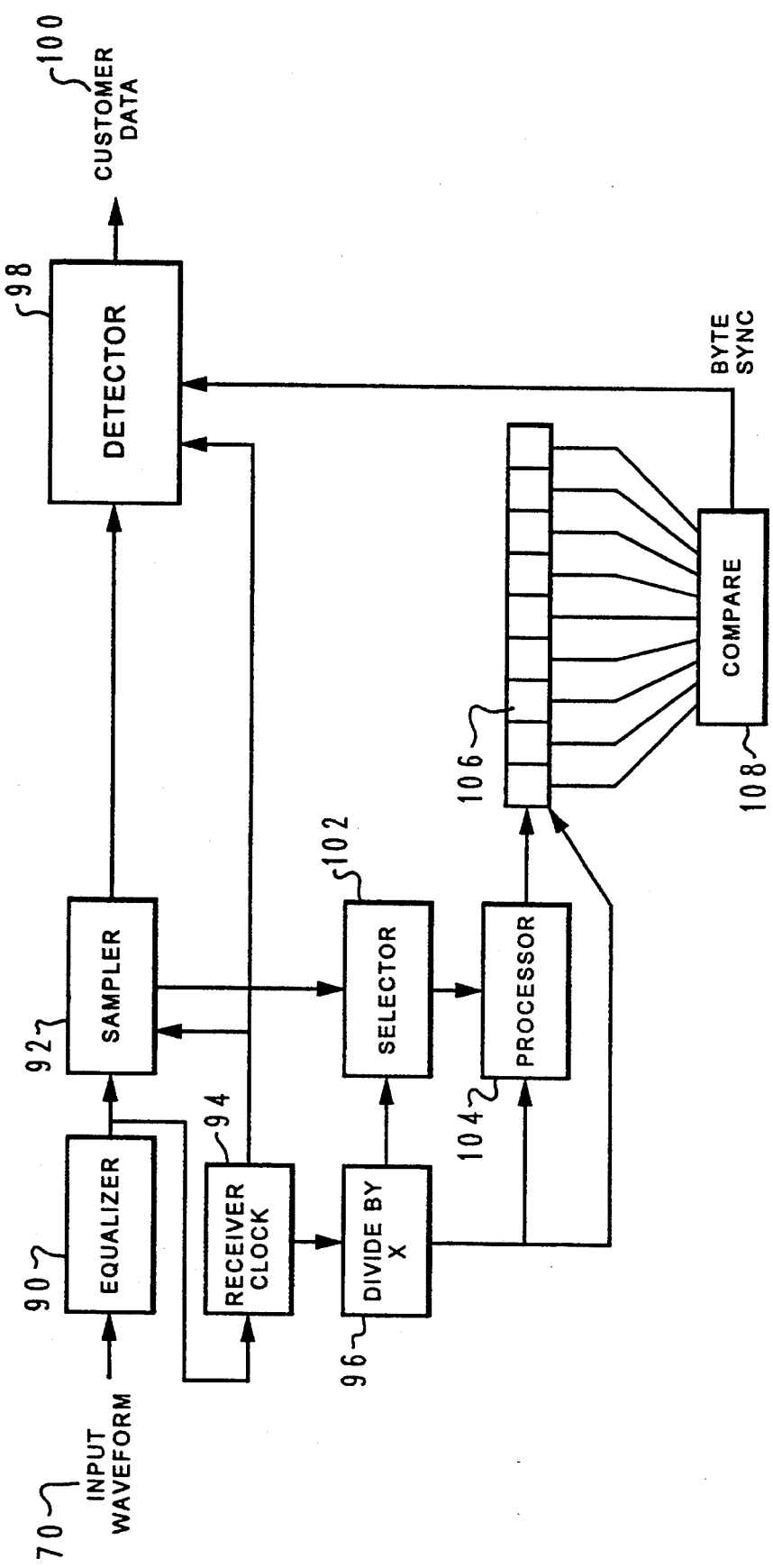
FIG. 2 is a high-level block diagram of the method and system for determining byte synchronization in accordance with the present invention.

With reference now to FIG. 2, there is depicted a high-level block diagram of the method and system for determining byte synchronization in accordance with the present invention. As illustrated, waveform source 69 provides waveform 70 which is input into equalizer 90, and, during an initial period before equalizer 90 has been trained, waveform 70 is input directly into receiver clock 94 In a preferred embodiment, waveform source 69 is implemented by a read head for producing a waveform in response to magnetic flux changes on the surface of a magnetic storage media. Equalizer 90 performs an automatic gain control (AGC) function to compensate for amplitude variations in waveform 70, and shapes waveform 70 (i.e., controls ISI) to reduce the unwanted effects of overlapping signals which represent previously transmitted data bits. Equalizer 90 may be implemented utilizing a compromise equalizer or an adaptive equalizer.

Analog-to-digital converter (ADC) 92 may be implemented utilizing a high-speed, eight bit analog-to-digital converter which converts the analog representation of a serial data stream (waveform 70) to a series of eight bit digits. ADC 92 produces such eight bit digits, or samples of waveform 70, at a rate determined by the frequency of receiver clock 94.

The input of receiver clock 94 is either connected to waveform 70 or the output of equalizer 90, depending upon whether or not equalizer 90 has been trained. Receiver clock 94 is capable of phase-locking to either input. Receiver clock 94 is also able to produce a clock signal output that is an integer multiple of the input signal. For example, in a preferred embodiment of the present invention, receiver clock 94 receives an input signal having an input frequency, such as periodic training portion 52, and receiver clock 94 produces a receiver clock signal having a frequency that is four times the frequency of periodic training portion 52, and having a phase that matches the phase of periodic training portion 52. The output of receiver clock 94 is connected to ADC 92, divider 96, and detector 98.

Divider 96 performs a divide-by-x function to produce a clock signal that is a fraction of an input signal, which, in this example, is the output of receiver clock 94. In accordance with the present invention, divider 96 produces a periodic signal having a period equal to period 76 of periodic training portion 52. Thus, in a preferred embodiment of the present invention, divider 96 produces a periodic signal having a frequency equal to one fourth the frequency of receiver clock 94.

Detector 98 receives digital sample words, representing equalized waveform 70, from ADC 92, and produces a data stream of "ones" and "zeros," such as data bits 58 (see FIG. 1A), which are determined by such digital sample words that represent the shape of waveform 70. The shape of waveform 70 may be determined by reading flux changes, recorded in a non-return-to-zero (NRZ) format, from a magnetic media, such as the surface of a hard disk. The output of detector 98, called customer data 100, is the data set a user or customer desires to read from a disk drive, or receive via other transmission media.

However, before detector 98 can produce customer data 100, byte sync must be detected and indicated to detector 98 so that detector 98 may identify the first bit of the first word of customer data 100. If data detector 98 is implemented utilizing a "time-varying detector," the receipt of a byte sync indication is required to enable the time-varying detector to properly analyze the stream of digital sample words.

As part of the process of detecting byte sync, selector 102, which receives inputs from ADC 92 and divider 96, periodically selects a subset of the sample words (see sample points 72 of FIG. 1A) as they are produced by ADC 92. Selector 102 utilizes a selection pattern to select these sample words. Such a selection pattern has a period equal to period 76 of periodic training portion 52. For example, in one embodiment of the present invention, where period 76 of periodic training portion 52 is four receiver clock cycles, the selection pattern utilized may cause selector 102 to select a first sample word from a series of four consecutive sample words produced by ADC 92. The use of other selection patterns to select sample words will be described below, with reference to other embodiments of the present invention.

The digital sample words selected by selector 102 are then passed to processor 104. Processor 104 processes the selected sample words and produces output data, which is then clocked into shift register 106 at a rate of one data output per period 76 of periodic training portion 52. In one embodiment of the present invention, processor 104 outputs a "one" if the sign of the sample input into processor 104 is positive, and outputs a "zero" if the sample input is negative. In some embodiments, such a selection of the sign of a sample word may be implemented by producing an output that correlates to the "sign bit" of each sample word input into processor 104. In other embodiments, processor 104 may produce an output that is a result of comparing the magnitude, or sign, of two sample words selected by selector 102 utilizing a selection pattern that selects two sample words within a single period 76. In the case where two sample words are compared by processor 104, selector 102 may provide processor 104 with two inputs, each inputting a selected sample word.

According to an important aspect of the present invention, digital sample words are selected by selector 102, and are processed by processor 104, with the same periodicity as periodic training portion 52.

In the acquisition and detection of byte sync, it is important to take advantage of all information available in the incoming waveform. Periodic training portion 52 has a distinctive periodicity, which is normally ignored, but is used in the present invention to aid the process of detecting byte sync. By first identifying the frequency and phase of periodic training portion 52 the examination of the subsequent sync word portion 54 can be limited to a subset of selected sample words, the values of which can be made large, robust, and unambiguous (at the expense, of the intervening sample words, which are ignored by the process).

After the selected sample words are processed by processor 104, data from processor 104 is input to shift register 106 at a rate of one input per period. In one embodiment of the present invention, shift register 106 may be implemented utilizing a nine-bit shift register. By utilizing a nine-bit shift register, one sign bit from sample words selected from each of nine periods spanning a thirty-six bit sync word may be loaded into shift register 106. The word shifted into shift register 106 may be referred to as a sync indicator word because the bits comprising this word, or the magnitude of this word, indicate a level of certainty as to whether or not a sync word has been identified within waveform 70.

The contents of waveform 70 are monitored continuously as sample words selected from waveform 70 are processed and compared to preselected criteria. During each period, the contents of shift register 106 are compared to preselected criteria by comparator 108. In response to a correlation between the sync indicator word and the preselected criteria, comparator 108 indicates that byte synchronization exists between (a) incoming waveform 70, which represents a serial data stream transmitted at a rate determined by a data clock, and (b) the data detector within said data processing system which operates at a frequency determined by receiver clock 94. When byte sync is indicated, receiver clock 94 should be operating at the same frequency, and with the same phase, as the data clock at the transmitting device. In the case where data is being read from a disk drive media, the disk drive read head may be considered the transmitting device. Thus, after byte sync has been indicated, receiver clock 94 should be operating at the same frequency, and with the same phase, as the data clock utilized to write customer data 56 onto the disk drive media.

Comparator 108 indicates that byte synchronization exists if greater than a preselected number of bits comprising an indicator word within shift register 106 match corresponding bits in a preselected sync indicator word. For example, in one embodiment of the present invention, comparator 108 indicates byte sync if more than six bits of the sync indicator word match corresponding bits in the preselected sync indicator word. Therefore, the sync indicator word is not required to exactly match the preselected sync indicator word before comparator 108 indicates that byte synchronization exists; byte sync may be indicated based upon a predetermined degree of correlation between the sync indicator word and the preselected sync indicator word.

In another embodiment of the present invention, shift register 106 may contain entire sample words, such as the eight bit sample words produced by ADC 92, which are temporarily stored in a shift register that is eight bits wide. Comparator 108 may then be utilized to evaluate these sample words by calculating a number based upon the value of all selected sample words, and comparing this calculated number to a preselected number. If the calculated number exceeds the preselected number, then comparator 108 may indicate that byte sync exists.

Figure 3:
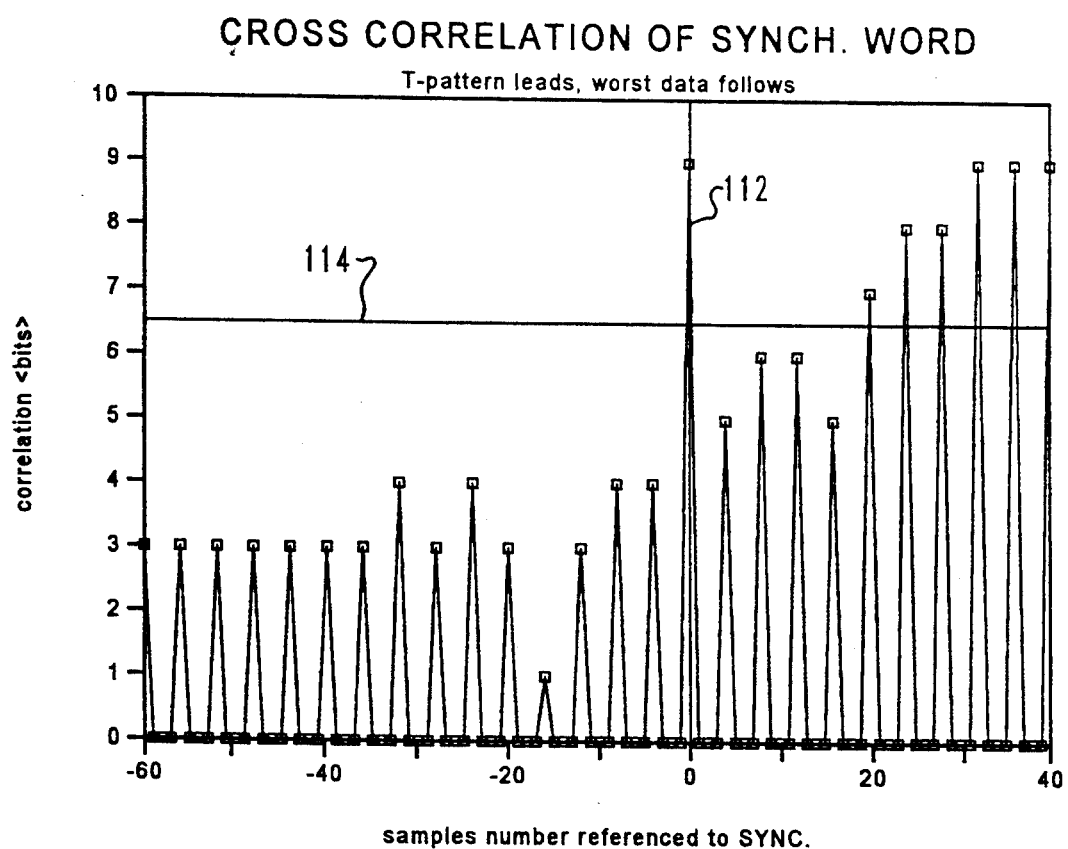
FIG. 3 depicts a graph illustrating the degree of correlation between the sync indicator word and the preselected sync indicator word.

With reference now to FIG. 3, there is depicted a graph illustrating the degree of correlation between the sync indicator word and the preselected sync indicator word, as data from processor 104 is input into shift register 106. The vertical axis of the graph illustrates the number of matches between bits in shift register 106 and the preselected sync indicator word. The horizontal axis indicates the number of sample words received before and after byte sync is determined. As illustrated, a maximum number of four bits in the sync indicator word stored in shift register 106 match the preselected sync indicator word before byte sync is indicated at sample 112. The number of matches that must be exceeded before byte sync is indicated is shown at threshold 114.

Thus, FIG. 3 illustrates the importance of selecting a sync indicator word having a relatively large euclidean distance from the data selected for the periodic training portion 52. Such euclidean distance reduces the likelihood that threshold 114 will be exceeded as data taken from periodic training portion 52 is shifted out of shift register 106 and data taken from sync word portion 54 is shifted into shift register 106. The selection of sync word 52 will be discussed in greater detail below.

Figure 4A:
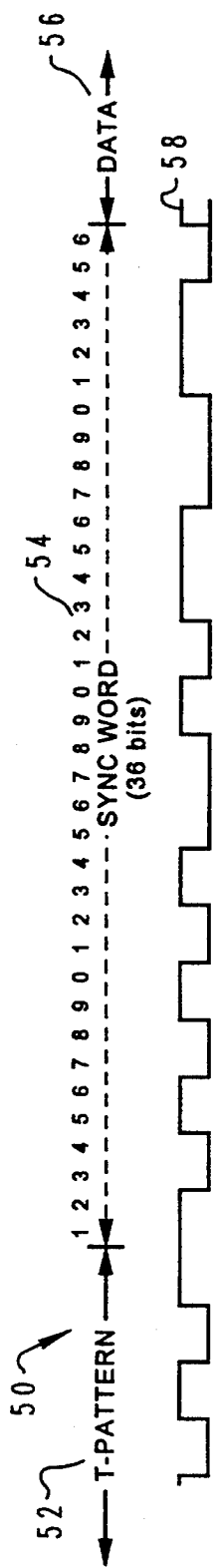
FIGS. 4A, 4B, and 4C depict one embodiment of the method and system for determining byte synchronization in accordance with the present invention.
Figure 4B:
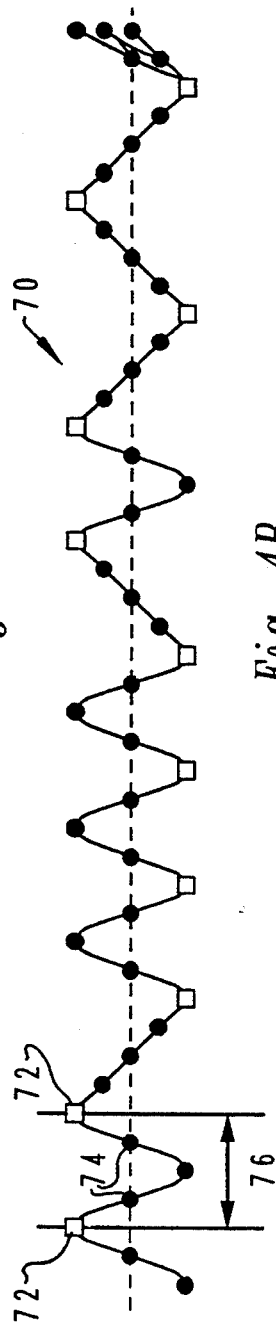
Figure 4C:
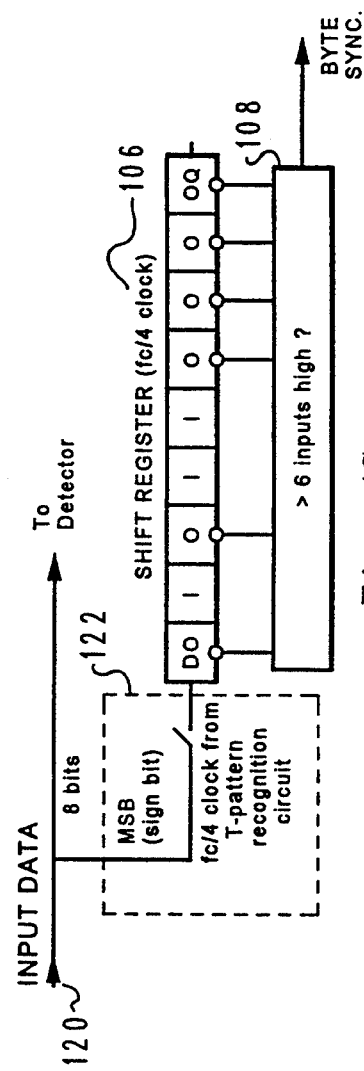

With reference now to FIGS. 4A, 4B, and 4C, there is depicted a digital waveform 50 which includes periodic training portion 52, sync word portion 54, and customer data 56. The width of data bit 58 within customer data 56 represents the duration of one bit.

As illustrated, periodic training portion 52 comprises two "high" bits followed by two "low" bits, and is typically twenty to thirty bits in length. Such a bit pattern is periodic, having a period 76, and preferably produces a waveform having a relatively high amplitude and high frequency, when read from the surface of a magnetic media. The purpose of periodic training portion 52 is to provide an exemplary waveform which allows a receiver circuit to set an AGC, and to provide a reference with which the receiver clock may be phase-locked.

Sync word portion 54 is thirty-six bits in length, and is nine times the length of period 76 of periodic training portion 52. The data bits comprising sync word portion 54 are selected (1) to produce a high amplitude signal when read from the surface of a magnetic media; (2) to produce high magnitude samples, such as sample points 72, when sampled at particular times with reference to period 76 of periodic training portion 52; and (3) to avoid sequential transitions spaced one bit apart. The bits of sync word portion 54 are also selected to have a relatively high euclidean distance from the data of periodic training portion 52.

Referring now to FIG. 4B, there is depicted analog waveform 70 which represents digital waveform 50, of FIG. 4A. Both sample points 72 and 74 represent samples that are periodically produced by ADC 92. Sample points 72 represent samples selected by selector 102 of FIG. 2.

Referring now to FIG. 4C, there is depicted a high-level block diagram of one embodiment of the present method and system for determining byte synchronization in accordance with the present invention. Input data 120 represents a series of eight bit digits, or sample words, produced by ADC 92 of FIG. 2. Such sample words are received as input data 120 at a rate determined by the frequency of receiver clock 94 of FIG. 2.

As depicted at block 122, which represents functions including functions performed by selector 102 and processor 104 (see FIG. 2), the most significant bit (MSB), or sign bit, of selected eight bit sample words are loaded into shift register 106 at a rate of one fourth of the frequency of receiver clock 94. Thereafter, comparator 108 indicates that byte sync exists if greater than six inputs, which correspond to bits within shift register 106, represent a "high" or "one" condition. Therefore, byte sync is indicated if the waveform depicted in sync word portion 54 of FIG. 4B is digitized and received as input data 120.

Ideally, the sign bits of samples 72 selected from sync word portion 54 will form the digital word "010110000." If such a word is formed in shift register 106, and if selected bits comprising such a word are inverted as indicated, then all inputs from shift register 106 to comparator 108 will be high, and byte sync will be indicated. The digital word chosen for sync word portion 52 preferably has a distance (i.e., square distance, e.g., EPRML=four) per detected attribute equal to sixteen. The seven words formed by selector 102 and processor 104 that meet this criteria are: (1) "010110000" (which is utilized in the present example), (2) "011010000," (3) "101001000," (4) "100101000," (5) "101101000," (6) "010011000," and (7) "011000010."

According to an important aspect of the present invention, some error in the formation of such a sync indicator word may be acceptable, and byte sync may be indicated although some bits shifted into shift register 106 were not expected. For example, if two of selected samples 72 have a sign bit that does not correspond to bits that were expected as a result of selectively sampling sync word portion 52, the remaining seven samples 72 having correct or expected sign bits may still cause comparator 108 to indicate byte sync. However, in this example, if three samples 72 contain an unexpected sign bit, comparator 108 will not indicate byte sync.

Thus, all input data 120 need not correlate exactly to data that was expected in order for comparator 108 to indicate byte sync; in this example, only seven of nine of the sign bits selected from samples 72 need be correct. This permits some tolerance in the correlation between the sync indicator word formed in shift register 106 and preselected criteria. An example of such preselected criteria is the specification of a threshold requiring that more than six bits in the sync indicator word formed in shift register 106 match bits in a preselected sync indicator word, where such a preselected sync indicator word was selected based upon data the receiving unit expects to receive.

Referring now to FIGS. 5A, 5B, and 5O, there is depicted a second embodiment of the method and system for determining byte synchronization in accordance with the present invention. In this embodiment, however, sync word 124 is utilized. Samples 7.2 are selected utilizing a selection pattern that selects the first two sample words of the four sample words within period 76. Once these two sample words have been selected, the magnitude of these two sample words are compared. Such selection and comparison functions are performed as shown in block 122. Block 122 includes circuitry to perform the functions performed by selector 102 and processor 104 of FIG. 2.

The outcome of such a comparison is either a one or a zero, which is then shifted into shift register 106. For example, if the magnitude of a prior sample word is greater than the magnitude of a current sample word, the result of the comparison would be a zero. While such results of this magnitude comparison are shifted into shift register 106 at the rate of one bit every period 76, comparator 108 determines whether or not greater than six inputs to comparator 108 are high.

If greater than six inputs to comparator 108 are high, comparator 108 indicates byte sync. Some tolerance in the correlation between the sync indicator word formed in shift register 106 and preselected criteria is allowed because two of the nine bits may be different from data that was expected. An example of such preselected criteria is the specification of a threshold requiring that more than six bits in the sync indicator word formed in shift register 106 match bits in a preselected sync indicator word which was selected based upon data the receiving unit expects to receive.

The embodiment shown in FIGS. 5A, 5B, and 5C has the benefit of being insensitive to DC offset.

With reference to FIGS. 6A, 6B, and 6C, there is depicted a third embodiment of the method and system for determining byte synchronization in accordance with the present invention. In this embodiment, however, sync word 128, which comprises 38 bits, is utilized. Samples 72 are selected utilizing a selection pattern that selects the first and the last sample words of the four sample words within period 76. Once these two sample words have been selected, the magnitude of these two sample words are compared. Such selection and comparison functions are performed as shown in block 122. Block 122 includes circuitry to perform the functions performed by selector 102 and processor 104 of FIG. 2.

The outcome of such a comparison is either a one or a zero, which is then shifted into shift register 106. For example, if the magnitude of a prior sample word is greater than the magnitude of a current sample word, the result of the comparison would be a zero. While such results of this magnitude comparison are shifted into shift register 106 at the rate of one bit every period 76, comparator 108 determines whether or not greater than six inputs to comparator 108 are high. If greater than six inputs to comparator 108 are high, comparator 108 indicates byte sync. Some tolerance in the correlation between the sync indicator word formed in shift register 106 and preselected criteria is allowed because two of the nine bits may be different from data that was expected. An example of such preselected criteria is the specification of a threshold requiring that more than six bits in the sync indicator word formed in shift register 106 match bits in a preselected sync indicator word which was selected based upon data the receiving unit expects to receive.

The embodiment shown in FIGS. 6A, 6B, and 6C has the benefit of being insensitive to DC offset, and having a sync word portion 128 that has no immediately adjacent transitions.

And finally, with reference to FIGS. 7A, 7B, and 7C, there is depicted a fourth embodiment of the method and system for determining byte synchronization in accordance with the present invention. In this embodiment, however, sync word 130, which comprises 18 bits, is utilized. Samples 72 are selected utilizing a selection pattern that selects the first and the third sample words of the four sample words with period 76. Once these two sample words have been selected, the magnitude of these two sample words, without considering the sign of the sample words, is compared to a "+2 reference signal." Such comparisons to an absolute reference are conducted at a rate equal to one-half the rate of receiver clock 94 (see FIG. 2). This means that divider 96 produces a clock signal that is one-half the rate of the clock signal produced by receiver clock 94. Such selection, comparison, and clock functions are performed as shown in block 122. Block 122 includes circuitry to perform the functions performed by selector 102, processor 104, and divider 96 of FIG. 2.

The outcome of such a comparison conducted in block 122 is either a one or a zero, which is then shifted into shift register 106. For example, if the absolute value of a sample word is greater than +2, the result of the comparison would be a one. While such results of this comparison are shifted into shift register 106 at the rate of two bits every period 76, comparator 108 determines whether or not greater than six inputs to comparator 108 are high. If greater than six inputs to comparator 108 are high, comparator 108 indicates byte sync. Some tolerance in the correlation between the sync indicator word formed in shift register 106 and preselected criteria is allowed because two of the nine bits may be different from data that was expected. An example of such preselected criteria is the specification of a threshold requiring that more than six bits in the sync indicator word formed in shift register 106 match bits in a preselected sync indicator word which was selected based upon data the receiving unit expects to receive.

The benefit of the embodiment illustrated in FIGS. 7A, 7B, and 7C is that this embodiment may determine byte sync without knowing, in advance, the polarity of data represented by waveform 70. This embodiment relies on the amplitude of the samples, and the fact that inner samples (between +2 and −2) may be distinguished from outer samples. Distinguishing between inner samples and outer samples may be as simple as examining the two most significant bits of a sample word. In this embodiment, a periodicity of two (rather than four) is established by the periodic training portion 52. In this embodiment, nine samples 72 are selected from sync word 130 which comprises 18 bits. This means that the distance per attribute drops by 6 dB. The net impact is approximately 3 dB loss in distance relative to an implementation based on a known channel polarity. Despite this loss, the embodiments of FIGS. 7A, 7B, and 7C are more robust than current byte sync detection utilizing PRML implementations.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for determining byte synchronization between (a) an incoming waveform representing a serial data stream transmitted at a rate determined by a data clock utilized to produce said incoming waveform and (b) a data detector within said data processing system operating at a rate determined by a receiver clock, said method comprising the steps of:

providing a synchronization pattern within said incoming waveform, said synchronization pattern having (a) a periodic training portion and (b) a sync word portion, wherein said periodic training portion of said incoming waveform has a period, and wherein said sync word portion represents a sync word;

phase-locking said receiver clock to said periodic training portion of said incoming waveform;

periodically sampling said incoming waveform at times relative to the phase and frequency of said receiver clock to produce samples;

periodically selecting a subset of said samples utilizing a selection pattern, said selection pattern having a period equal to said period of said periodic training portion of said incoming waveform;

producing a sync indicator word from said subset of said samples;

comparing said sync indicator word to preselected criteria to determine a degree of correlation between said sync indicator word and said preselected criteria; and indicating byte synchronization between (a) said incoming waveform representing a serial data stream transmitted at a rate determined by a data clock utilized to produce said incoming waveform and (b) said data detector within said data processing system in response to a selected degree of correlation between said sync indicator word and said preselected criteria, wherein said byte synchronization may indicate the ability of said data detector to correctly identify and interpret bits and words within said serial data stream within said incoming waveform.

2. The method in a data processing system for determining byte synchronization according to claim 1 wherein said step of comparing said sync indicator word to preselected criteria to determine a degree of correlation between said sync indicator word and said preselected criteria comprises comparing bits in said sync indicator word to bits in a preselected sync indicator word to determine a degree of correlation between said sync indicator word and said preselected sync indicator word.

3. The method in a data processing system for determining byte synchronization according to claim 1 wherein said step of indicating byte synchronization between (a) said incoming waveform representing a serial data stream transmitted at a rate determined by a data clock and (b) said data detector within said data processing system in response to a selected degree of correlation between said sync indicator word and said preselected criteria comprises indicating byte synchronization between (a) said incoming waveform representing a serial data stream transmitted at a rate determined by a data clock and (b) said data detector within said data processing system in response to a preselected number of bits in said sync indicator word matching corresponding bits in said preselected sync indicator word.

4. The method in a data processing system for determining byte synchronization according to claim 1 wherein said step of providing in said incoming waveform a synchronization pattern having (a) a periodic training portion and (b) a sync word portion comprises providing a periodic training portion comprising a relatively high amplitude, high frequency, sinusoidal waveform.

5. The method in a data processing system for determining byte synchronization according to claim 1 wherein said step of providing in said incoming waveform a synchronization pattern having (a) a periodic training portion and (b) a sync word portion comprises providing a periodic training portion having a period having a duration of four clock cycles of said data clock.

6. The method in a data processing system for determining byte synchronization according to claim 1 wherein said step of providing in said incoming waveform a synchronization pattern having (a) a periodic training portion and (b) a sync word portion comprises providing a sync word portion having a length that is an integer multiple of said period of said periodic training portion.

7. The method in a data processing system for determining byte synchronization according to claim 1 wherein said step of periodically selecting a subset of said samples utilizing a selection pattern comprises periodically selecting one of every four of said samples.

8. The method in a data processing system for determining byte synchronization according to claim 1 wherein said step of producing a sync indicator word from said subset of said samples comprises selecting a most significant bit from each of said subset of said samples to produce said sync indicator word.

9. The method in a data processing system for determining byte synchronization according to claim 1 wherein said step of producing a sync indicator word from said subset of said samples comprises the steps of:

selecting two of said samples within said subset of said samples;

comparing the values of said two selected samples; and producing said sync indicator word in response to said comparison.

10. A data processing system for determining byte synchronization between (a) an incoming waveform representing a serial data stream transmitted at a rate determined by a data clock utilized to produce said incoming waveform and (b) a data detector within said data processing system operating at a rate determined by a receiver clock comprising:

means for providing a synchronization pattern within said incoming waveform, said synchronization pattern having (a) a periodic training portion and (b) a sync word portion, wherein said periodic training portion of said incoming waveform [having]has a period, and wherein said sync word portion represents a sync word;

means for phase-locking said receiver clock to said periodic training portion of said incoming waveform;

means for periodically sampling said incoming waveform at times relative to the phase and frequency of said receiver clock to produce samples;

means for periodically selecting a subset of said samples utilizing a selection pattern, said selection pattern having a period equal to said period of said periodic training portion of said incoming waveform;

means for producing a sync indicator word from said subset of said samples;

means for comparing said sync indicator word to preselected criteria to determine a degree of correlation between said sync indicator word and said preselected criteria; and means for indicating byte synchronization between (a) said incoming waveform representing a serial data stream transmitted at a rate determined by a data clock utilized to produce said incoming waveform and (b) said data detector within said data processing system in response to a selected degree of correlation between said sync indicator word and said preselected criteria, wherein said byte synchronization may indicate the ability of said data detector to correctly identify and interpret bits and words within said serial data stream within said incoming waveform.

11. The data processing system for determining byte synchronization according to claim 10 wherein said means for comparing said sync indicator word to preselected criteria to determine a degree of correlation between said sync indicator word and said preselected criteria comprises means for comparing bits in said sync indicator word to bits in a preselected sync indicator word to determine a degree of correlation between said sync indicator word and said preselected sync indicator word.

12. The data processing system for determining byte synchronization according to claim 10 wherein said means for indicating byte synchronization between (a) said incoming waveform representing a serial data stream transmitted at a rate determined by a data clock and (b) said data detector within said data processing system in response to a selected degree of correlation between said sync indicator word and said preselected criteria comprises means for indicating byte synchronization between (a) said incoming waveform representing a serial data stream transmitted at a rate determined by a data clock and (b) said data detector within said data processing system in response to a preselected number of bits in said sync indicator word matching corresponding bits in said preselected sync indicator word.

13. The data processing system for determining byte synchronization according to claim 10 wherein said means for providing in said incoming waveform a synchronization pattern having (a) a periodic training portion and (b) a sync word portion comprises means for providing a periodic training portion comprising a relatively high amplitude, sinusoidal waveform.

14. The data processing system for determining byte synchronization according to claim 10 wherein said means for providing in said incoming waveform a synchronization pattern having (a) a periodic training portion and (b) a sync word portion comprises means for providing a periodic training portion having a period having a duration of four clock cycles of said data clock.

15. The data processing system for determining byte synchronization according to claim 10 wherein said means for providing in said incoming waveform a synchronization pattern having (a) a periodic training portion and (b) a sync word portion comprises means for providing a sync word portion having a length that is an integer multiple of said period of said periodic training portion.

16. The data processing system for determining byte synchronization according to claim 10 wherein said means for periodically selecting a subset of said samples utilizing a selection pattern comprises means for periodically selecting one of every four of said samples.

17. The data processing system for determining byte synchronization according to claim 10 wherein said means for producing a sync indicator word from said subset of said samples comprises means for selecting a most significant bit from each of said subset of said samples to produce said sync indicator word.

18. The data processing system for determining byte synchronization according to claim 10 wherein said means for producing a sync indicator word from said subset of said samples comprises:

means for selecting two of said samples within said subset of said samples;

means for comparing the values of said two selected samples; and means for producing said sync indicator word in response to said comparison.

* * * * *